(12) United States Patent
Kano et al.

(10) Patent No.: US 8,284,504 B2
(45) Date of Patent: Oct. 9, 2012

(54) LENS FIXING DEVICE AND OPTICAL PICKUP DEVICE

(75) Inventors: Yasuyuki Kano, Anpachigun (JP); Kenji Asano, Kakamigahara (JP); Shigeki Hori, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 149 days.

(21) Appl. No.: 12/949,235

(22) Filed: Nov. 18, 2010

(65) Prior Publication Data

US 2011/0122514 A1 May 26, 2011

(30) Foreign Application Priority Data

Nov. 20, 2009 (JP) .................................. 2009-265674

(51) Int. Cl.
G02B 7/02 (2006.01)
(52) U.S. Cl. .......................... 359/811; 359/819; 359/822
(58) Field of Classification Search .......... 359/694–704, 359/811–834; 369/112.16–112.24
See application file for complete search history.

(56) References Cited

U.S. PATENT DOCUMENTS

| 6,061,191 A | * | 5/2000 | Tsai ............................... 359/819 |
| 6,144,511 A | * | 11/2000 | Umetsu et al. ................ 359/831 |
| 6,356,526 B1 | | 3/2002 | Ito |

FOREIGN PATENT DOCUMENTS

| JP | 61-121019 A | 6/1986 |
| JP | 2000-266977 A | 9/2000 |

OTHER PUBLICATIONS

Japanese Office Action for corresponding JP Application No. 2009-265674, dated Mar. 1, 2011, pp. 1-12, Japan.

* cited by examiner

*Primary Examiner* — Mohammed Hasan
(74) *Attorney, Agent, or Firm* — Ditthavong Mori & Steiner, P.C.

(57) ABSTRACT

A lens fixing device includes a lens holder having a lens (lens area) made of a resin, and a mounting portion. The lens holder has two projections. Each of the two projections is formed with a guide surface and a mounted surface. A line of intersection of an extension of the guide surface of the projections and an extension of the mounted surface of the projections in a plane direction is aligned with an optical axis of the lens area. The lens holder is positioned with respect to a plane direction orthogonal to the optical axis by contact of the guide surfaces with receiving surfaces of the mounting portion. The lens holder is fixedly attached by an adhesive.

10 Claims, 6 Drawing Sheets

PARTIAL SIDE SECTIONAL VIEW OF OPTICAL SYSTEM

TOP PLAN VIEW OF OPTICAL SYSTEM

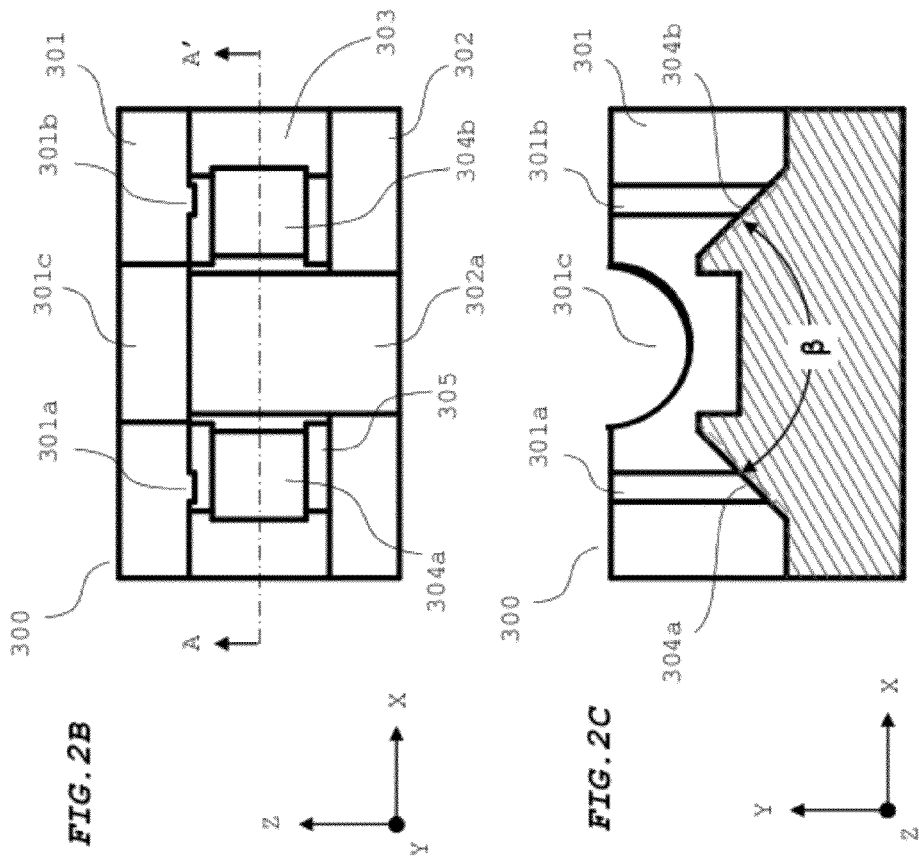
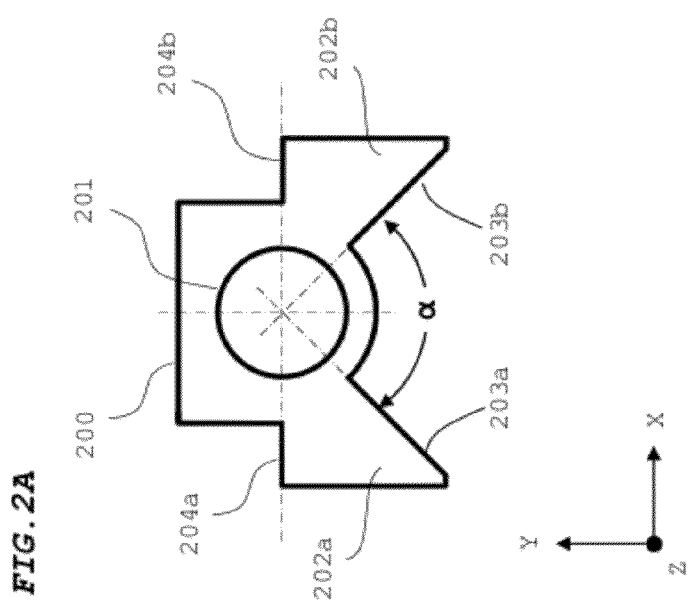
FIG.2B
FIG.2C
FIG.2A

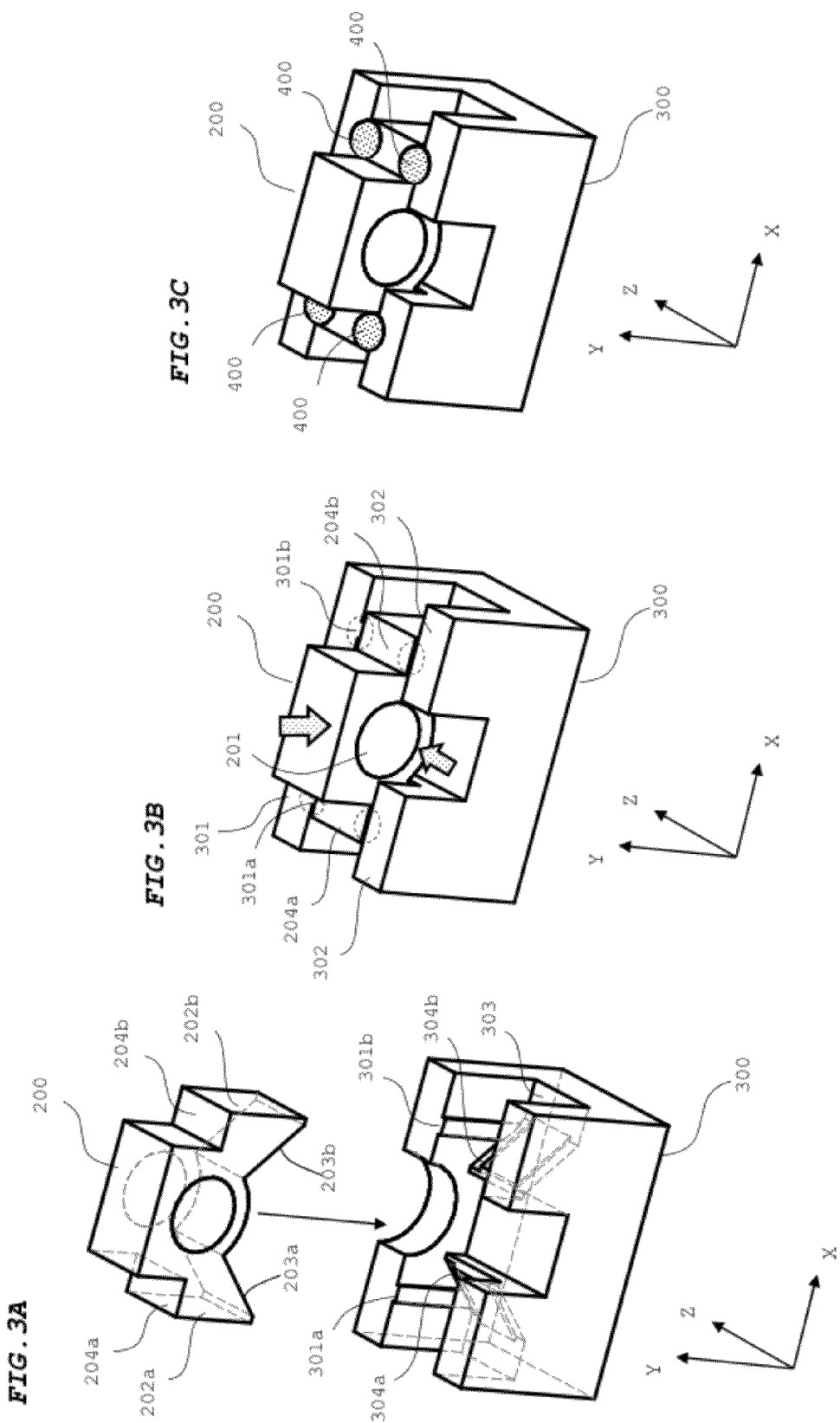

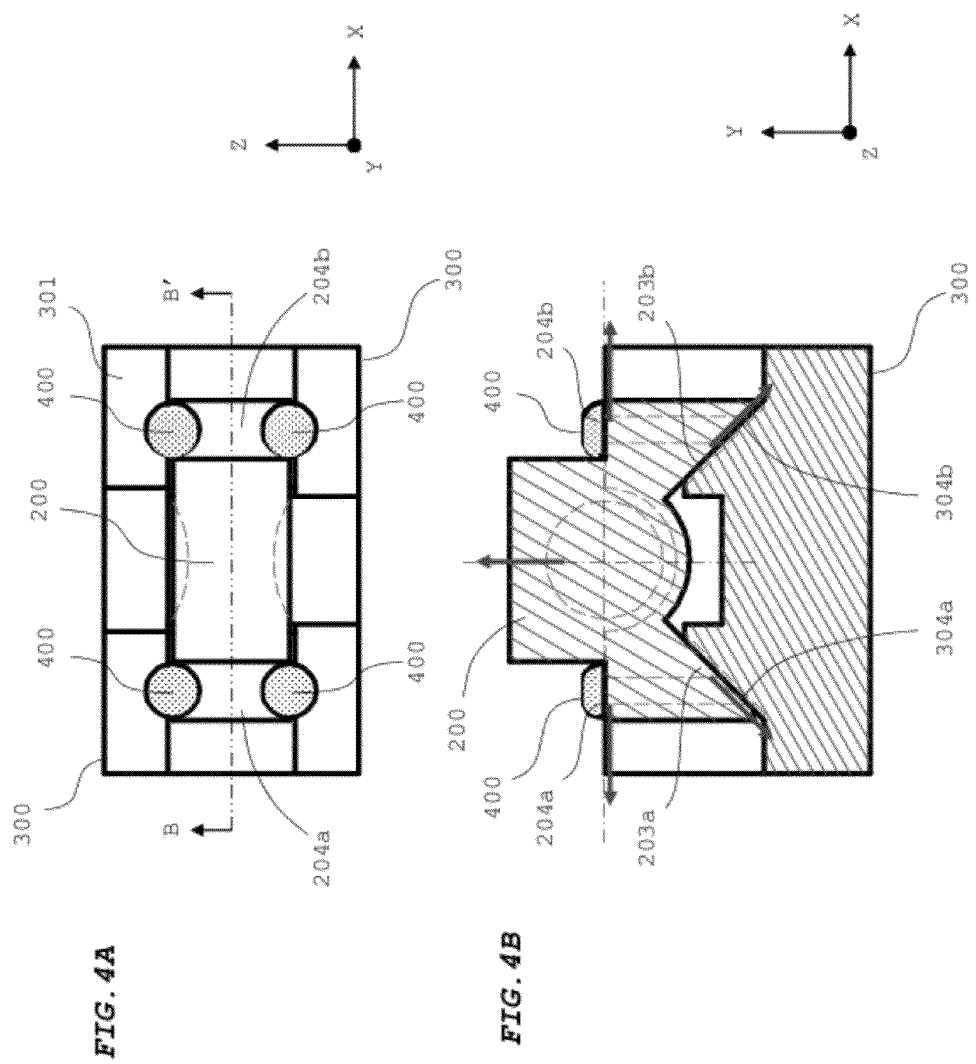

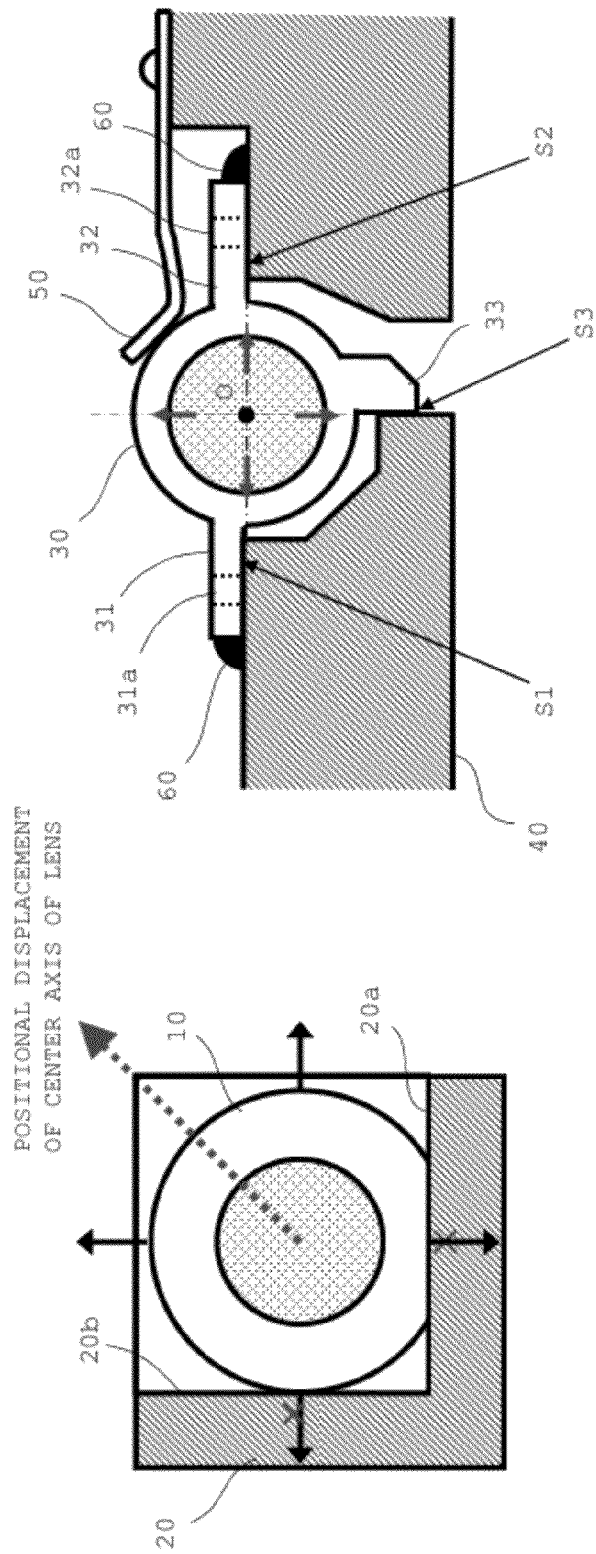

LENS FIXING DEVICE AND OPTICAL PICKUP DEVICE

This application claims priority under 35 U.S.C. Section 119 of Japanese Patent Application No. 2009-265674 filed Nov. 20, 2010, entitled "LENS FIXING DEVICE AND OPTICAL PICKUP DEVICE". The disclosure of the above applications is incorporated herein by reference.

BACKGROUND OF THE INVENTION

1. Field of the Invention

The present invention relates to a lens fixing device for fixing a lens made of a resin on a base, and an optical pickup device incorporated with the lens fixing device.

2. Disclosure of Related Art

In recent years, a lens made of a resin has been used in an optical device such as an optical pickup device. The resin lens has several advantages such as low cost and less weight, as compared with a conventional glass lens. However, the resin lens is likely to be deformed resulting from a temperature change, as compared with the glass lens. Deterioration of an optical characteristic resulting from the deformation has been a problem to be solved.

FIG. 6A is a diagram showing how a resin lens is fixed, when viewed from the optical axis direction of the lens. In this arrangement, a lens 10 is fixedly attached to a base 20, with an upper surface and a side surface of the lens 10 being in proximity to the base 20. In this arrangement, if the lens 10 is expanded with respect to the optical axis by a temperature rise, the lens 10 is displaced in the direction shown by the broken line arrow, while being pressed by surfaces 20a and 20b of the base 20. As a result, the optical axis of the lens 10 may be displaced from a proper position, and a characteristic of an optical system provided with the lens may be deteriorated. In an optical pickup device or a like device, several micrometers displacement of the optical axis of a lens may fail to secure a sufficient characteristic required for reading.

As a measure for solving the above drawback, there is known e.g. an arrangement as shown in FIG. 6B. In this arrangement, three engaging portions 31, 32, and 33 project radially from a lens holder 30. Surfaces S1, S2, and S3 of the engaging portions 31, 32, and 33 to be contacted with a base 40 are formed to radially extend from the optical axis O. The lens holder 30 is resiliently pressed in lower left direction by a plate spring 50 in a state that the surfaces S1, S2, and S3 are contacted with corresponding surfaces of the base 40. Further, the engaging portions 31 and 32 are fixedly attached to an upper surface of the base 40 by an adhesive 60. Cutaways 31a and 32a are respectively formed in the engaging portions 31 and 32 in the optical axis direction. With the cutaways 31a and 32a, the engaging portions 31 and 32 are allowed to flex in left and right directions.

In the above arrangement, when the lens is expanded with respect to the optical axis O by a temperature rise, the surfaces S1, S2, and S3 of the engaging portions 31, 32, and 33 are slidingly moved over the corresponding surfaces of the base 40. At the time of the movement, forces to be applied to the engaging portions 31 and 32 are absorbed by flexure of the portions corresponding to the cutaways 31a and 32a. Thus, optical axis displacement resulting from lens expansion is suppressed.

However, in the arrangement shown in FIG. 6B, since the cutaways 31a and 32a are formed in the engaging portions 31 and 32, the structure of the lens holder 30 becomes complex. Further, it is necessary to mount the plate spring 50 in a state that the surfaces S1, S2, and S3 are contacted with the corresponding surfaces of the base 40 and to fixedly attach the lens holder 30 by the adhesive 60 in mounting the lens holder 30 on the base 40, which necessitates a cumbersome operation. Furthermore, if the force to be applied from the plate spring 50 and the forces to be applied from the cutaways 31a and 32a are imbalanced at the time of lens expansion, optical axis displacement may occur in left and right directions.

SUMMARY OF THE INVENTION

A first aspect of the invention is directed to a lens fixing device. The lens fixing device according to the first aspect is provided with a lens portion including a lens made of a resin, and a mounting portion on which the lens portion is mounted.

The lens portion includes two projections projecting in directions away from a center axis of the lens. Each of the two projections has a guide surface opposing to the mounting portion, and amounted surface disposed away from the mounting portion with respect to the guide surface. Further, the guide surfaces and the mounted surfaces are disposed at such positions that a line of intersection of an extension of the respective guide surfaces and an extension of the respective mounted surfaces is aligned with the center axis of the lens. Furthermore, an angle defined by the guide surfaces of the two projections around the center axis is set smaller than 180 degrees.

The mounting portion includes two receiving surfaces to be brought into surface contact with the guide surfaces of the two respective projections in mounting the lens portion on the mounting portion. The mounting portion also includes a fixing surface adapted to be positioned adjacent to the mounted surfaces in a state that the two guide surfaces are brought into surface contact with the two respective receiving surfaces.

The mounted surfaces and the fixing surface are fixed to each other by an adhesive in a direction perpendicular to the mounted surfaces and the fixing surface in a state that the two guide surfaces are brought into surface contact with the two respective receiving surfaces.

A second aspect of the invention is directed to an optical pickup device. The optical pickup device according to the second aspect includes the lens fixing device according to the first aspect. For instance, a lens disposed in the optical pickup device and adapted for focus error detection is fixedly attached by the lens fixing device according to the first aspect.

BRIEF DESCRIPTION OF THE DRAWINGS

These and other objects, and novel features of the present invention will become more apparent upon reading the following detailed description of the embodiment along with the accompanying drawings.

FIGS. 2A through 2C are diagrams showing an arrangement of a lens portion and a mounting portion in the embodiment.

FIGS. 3A through 3C are diagrams showing a lens fixing step in the embodiment.

FIGS. 4A and 4B are diagrams showing an operation of the lens fixing device in the embodiment.

FIGS. 6A and 6B are diagrams showing an arrangement of a lens fixing device of a conventional example in detail.

Figure 1B:
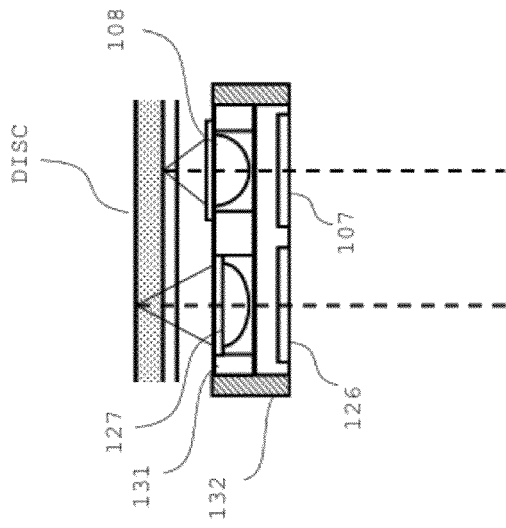
FIGS. 1A and 1B are diagrams showing an arrangement of an optical pickup device in an embodiment of the invention.

The drawings are provided mainly for describing the present invention, and do not limit the scope of the present invention.

DESCRIPTION OF PREFERRED EMBODIMENTS

In the following, an embodiment of the invention is described referring to the drawings. The embodiment is an example, in which the invention is applied to an optical pickup device for irradiating laser light onto BD, CD (Compact Disc), and DVD (Digital Versatile Disc), and a lens fixing device incorporated in the optical pickup device.

In this embodiment, a lens holder 200 corresponds to a lens portion in the claims. A lens area 201 corresponds to a lens in the claims. A mounting portion 300 corresponds to a mounting portion in the claims. The description regarding the correspondence between the claims and the embodiment is merely an example, and the claims are not limited by the description of the embodiment.

Figure 1A:
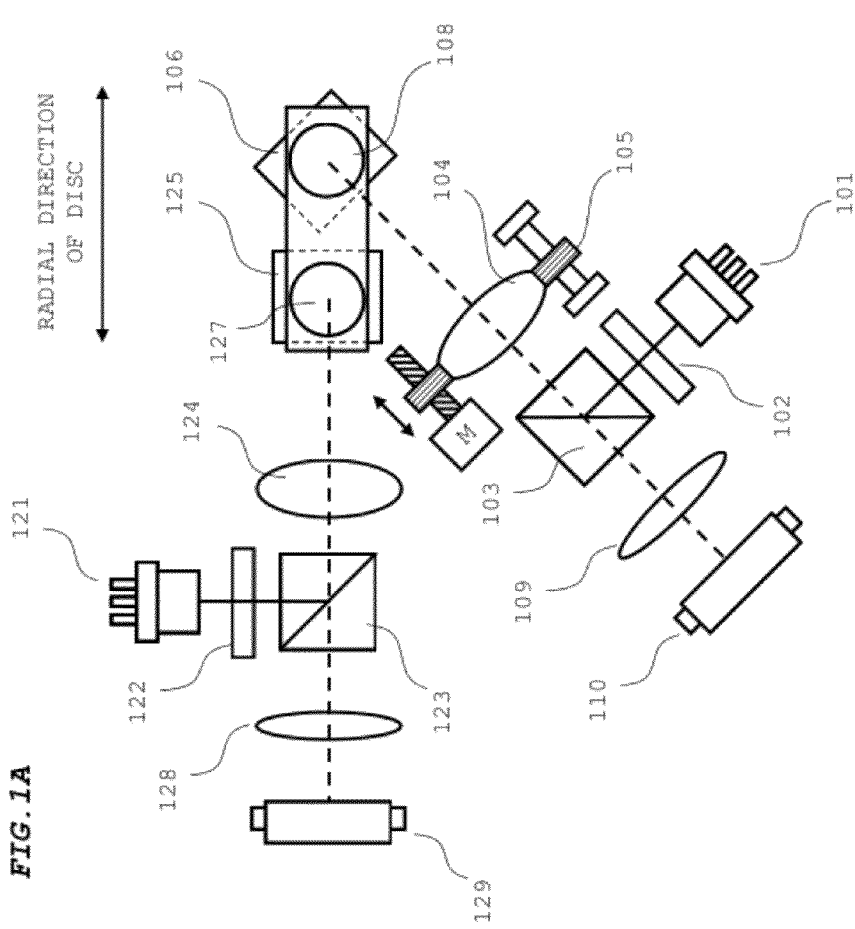

FIGS. 1A and 1B are diagrams showing an optical system in the optical pickup device as the embodiment. FIG. 1A is a top plan view of the optical system, and FIG. 1B is an internal perspective view of an objective lens actuator and peripheries thereof, when viewed from a side surface thereof. The optical system is divided into an optical system for BD and an optical system for CD/DVD.

The optical system for BD is constituted of a semiconductor laser 101, a diffraction grating 102, a polarized beam splitter 103, a collimator lens 104, a lens actuator 105, a rise-up mirror 106, a quarter wavelength plate 107, a first objective lens 108, an anamorphic lens 109, and a photodetector 110.

The semiconductor laser 101 outputs blue laser light of about 400 nm wavelength. The diffraction grating 102 separates laser light emitted from the semiconductor laser 101 into three beams. The polarized beam splitter 103 reflects laser light entered from the side of the diffraction grating 102. The collimator lens 104 converts laser light reflected on the polarized beam splitter 103 into parallel light. The lens actuator 105 drives the collimator lens 104 in the optical axis direction of laser light. The collimator lens 104 and the lens actuator 105 function as aberration correcting means.

The rise-up mirror 106 reflects laser light entered through the collimator lens 104 in the direction toward the first objective lens 108. The quarter wavelength plate 107 converts laser light reflected on the rise-up mirror 106 into circularly polarized light, and converts reflected light from the disc into linearly polarized light in a polarization direction orthogonal to the polarization direction of light to be entered into the disc. With the above arrangement, laser light reflected on the disc is transmitted through the polarized beam splitter 103 and guided to the photodetector 110.

The first objective lens 108 is designed to properly converge laser light of a wavelength corresponding to blue light on a signal surface of BD. Specifically, the first objective lens 108 is designed to properly converge laser light of a wavelength corresponding to blue light on a signal surface through a substrate of 0.1 mm thickness. The first objective lens 108 is made of a resin material.

The anamorphic lens 109 converges laser light reflected on the disc onto the photodetector 110. The anamorphic lens 109 is made of a resin material, and imparts astigmatism to reflected light from the disc. The anamorphic lens 109 is mounted on a base for holding the optical system shown in FIGS. 1A and 1B by a lens fixing device shown in FIGS. 2A through 2C, FIGS. 3A through 3C, and FIGS. 4A and 4B.

The photodetector 110 has a sensor pattern for deriving a reproduction RF signal, a focus error signal, and a tracking error signal, based on an intensity distribution of received laser light. In this embodiment, an astigmatism method is employed as a method for generating a focus error signal, and a DPP (Differential Push Pull) method is employed as a method for generating a tracking error signal. The photodetector 110 has a sensor pattern for deriving a focus error signal and a tracking error signal according to the above methods.

The optical system for CD/DVD is constituted of a semiconductor laser 121, a diffraction grating 122, a polarized beam splitter 123, a collimator lens 124, a rise-up mirror 125, a quarter wavelength plate 126, a second objective lens 127, an anamorphic lens 128, and a photodetector 129.

The semiconductor laser 121 is provided, in a CAN, with a laser element for outputting infrared laser light of about 780 nm wavelength and red laser light of about 650 nm wavelength. The diffraction grating 122 separates laser light emitted from the semiconductor laser 121 into three beams. The polarized beam splitter 123 reflects laser light entered from the side of the diffraction grating 122. The collimator lens 124 converts laser light reflected on the polarized beam splitter 123 into parallel light.

The rise-up mirror 125 reflects laser light entered through the collimator lens 124 in the direction toward the second objective lens 127. The quarter wavelength plate 126 converts laser light reflected on the rise-up mirror 125 into circularly polarized light, and converts reflected light from the disc into linearly polarized light in a polarization direction orthogonal to the polarization direction of light to be entered into the disc. With the above arrangement, laser light reflected on the disc is transmitted through the polarized beam splitter 123 and guided to the photodetector 129.

The second objective lens 127 is designed to properly converge laser light of a wavelength corresponding to infrared light and laser light of a wavelength corresponding to red light on signal surfaces of CD and DVD, respectively. Specifically, the second objective lens 127 is designed to properly converge laser light of a wavelength corresponding to infrared light on a signal surface through a substrate of 1.2 mm thickness, and properly converge laser light of a wavelength corresponding to red light on a signal surface through a substrate of 0.6 mm thickness. The second objective lens 127 is made of a resin material, as well as the first objective lens 108.

The anamorphic lens 128 converges laser light reflected on the disc onto the photodetector 129. The anamorphic lens 128 is made of a resin material, and imparts astigmatism to reflected light from the disc. The anamorphic lens 128 is mounted on the aforementioned base by the lens fixing device shown in FIGS. 2A through 2C, FIGS. 3A through 3C, and FIGS. 4A and 4B, as well as the anamorphic lens 109.

The photodetector 129 has a sensor pattern for deriving a reproduction RF signal, a focus error signal, and a tracking error signal, based on an intensity distribution of received laser light. In this embodiment, as described above, an astigmatism method is employed as a method for generating a focus error signal, and a DPP (Differential Push Pull) method is employed as a method for generating a tracking error signal. The photodetector 129 has a sensor pattern for deriving a focus error signal and a tracking error signal according to the above methods.

The first objective lens 108, the second objective lens 127, and the quarter wavelength plates 107 and 126 are mounted on a common holder 131. The holder 131 is driven in the focusing direction and the tracking direction by an objective lens actuator 132. With the above arrangement, the first objective lens 108, the second objective lens 127, and the quarter wavelength plates 107 and 126 are integrally driven, as the holder 131 is driven. The objective lens actuator 132 is constituted of a coil and a magnetic circuit, and the coil is mounted on the holder 131.

The first objective lens 108 and the second objective lens 127 are disposed side by side in a radial direction of the disc. In the above arrangement, the first objective lens 108 having a smaller lens diameter than the second objective lens 127 is disposed at a position closer to the inner periphery of the disc.

Next, a lens fixing device for fixedly attaching the anamorphic lenses 109 and 128 on a base is described referring to FIGS. 2A through 2C, and FIGS. 3A through 3C.

FIG. 2A is a side view of the lens holder 200 including the anamorphic lens 109 and 128, when viewed from the optical axis direction of the lens. FIG. 2B is a top plan view of the mounting portion 300 which is disposed on the side of the base, and on which the lens holder 200 is mounted. FIG. 2C is a cross-sectional view taken along the line A-A' in FIG. 2B. FIGS. 3A through 3C are perspective views showing a step of fixedly attaching the lens holder 200 on the mounting portion 300.

Referring to FIGS. 2A and 3A, the lens holder 200 has a lens area 201 in the center thereof. The anamorphic lens 109 or the anamorphic lens 128 is integrally formed in the lens area 201. Specifically, the lens holder 200 is integrally formed with the anamorphic lens 109 or the anamorphic lens 128 by resin-molding.

The lens holder 200 has a symmetrical shape with respect to a plane in parallel to Y-Z plane. The lens holder 200 has two projections 202a and 202b at left and right positions thereof. The projection 202a is formed with a flat guide surface 203a and a mounted surface 204a. The projection 202b is formed with a flat guide surface 203b and a mounted surface 204b. In this embodiment, the angle α defined by the two guide surfaces 203a and 203b is set to 90 degrees. The mounted surfaces 204a and 204b extend in parallel to X-Z plane.

The guide surfaces 203a and 203b, and the mounted surfaces 204a and 204b are disposed at such positions that an extension of the guide surface 203a (203b), and an extension of the mounted surface 204a (204b) in a plane direction intersect at a line of intersection, and the line of intersection is aligned with the optical axis (center axis) of the lens area 201.

Referring to FIGS. 2B, 2C, and 3A, the mounting portion 300 has a symmetrical shape with respect to Y-Z plane. The mounting portion 300 is integrally formed with the base by using a resin material (PPS: polyphenylenesulfide). Two wall portions 301 and 302 are formed on the mounting portion 300. A recessed portion 303 is formed between the wall portions 301 and 302. Ribs 301a and 301b extending in Y-axis direction are formed on an inner surface of the wall portion 301. Further, the wall portion 301 is formed with a semicircular-shaped cutaway 301c for guiding laser light to the lens area 201 when the lens holder 200 is mounted on the mounting portion 300. The wall portion 302 is formed with a rectangular cutaway 302a at a position opposing to the cutaway 301c.

Two receiving surfaces 304a and 304b are formed on the recessed portion 303. The angle β defined by the two receiving surfaces 304a and 304b around Z-axis is set to 90 degrees. A step portion 305 lower than the receiving surfaces 304a and 304b is formed on end edges of the receiving surfaces 304a and 304b in Z-axis direction.

In fixedly attaching the lens holder 200 on the mounting portion 300, firstly, as shown in FIG. 3A, the lens holder 200 is placed in the recessed portion 303 of the mounting portion 300 from above. Then, the guide surfaces 203a and 203b are respectively brought into contact with the receiving surfaces 304a and 304b. With the above operation, as shown in FIG. 3B, the lens holder 200 is held on the mounting portion 300. At the time of the mounting, the mounted surfaces 204a and 204b, and upper surfaces (corresponding to a fixing surface in the claims) of the wall portions 301 and 302 are made substantially flush with each other. Thereafter, a UV curable adhesive 400 is applied from above onto boundary portions (shown by the broken lines in FIG. 3B) between the mounted surfaces 204a and 204b, and the upper surfaces of the wall portions 301 and 302 in a state that an upper surface and a front surface of the lens holder 200 are pressed, and then, UV light is irradiated to cure the adhesive 400. With the above operation, as shown in FIG. 3C, the lens holder 200 is fixedly attached to the mounting portion 300. An acrylic-based adhesive or an epoxy-based adhesive may be used as the adhesive 400.

Then, when the lens holder 200 is pressed from above in the state shown in FIG. 3B, the guide surfaces 203a and 203b are respectively pressed against the receiving surfaces 304a and 304b, and the position of the lens area 201 on X-Y plane is fixed. With the above operation, the optical axis of the lens area 201 is adjusted to be aligned with the optical axis of the optical system shown in FIGS. 1A and 1B. Further, when the lens holder 200 is pressed from the front side, the back surface of the lens holder 200 is pressed against the ribs 301a and 301b, and the position of the lens area 201 in Z-axis direction is fixed. With the above operation, the position of the lens area 201 in the optical axis direction is adjusted to a proper position. When the lens holder 200 is adhered to the mounting portion 300 as described above, the lens area 201 is fixed at the proper position.

As described above, in this embodiment, the lens holder 200 (anamorphic lenses 109 and 128) can be fixedly attached to the mounting portion 300 (base) only by placing the lens holder 200 in the recessed portion 303 of the mounting portion 300, and adhering the lens holder 200 by the adhesive 400. Further, at the time of adhesion, the lens area 201 (anamorphic lenses 109 and 128) can be positioned to a proper position only by pressing the lens holder 200 from above and from the front side.

FIGS. 4A and 4B are diagrams showing an operation of the lens fixing device at the time of lens expansion.

When the lens holder 200 is radially expanded with respect to the optical axis (center axis) of the lens area 201 resulting from a temperature rise, the parts of the lens holder 200 are moved in the direction shown by the arrows in FIG. 4B. At the time of movement, the guide surfaces 203a and 203b are respectively slidingly moved over the receiving surfaces 304a and 304b. Further, the mounted surfaces 204a and 204b are moved in X-axis direction by resilient deformation of the adhesive 400. In this embodiment, the adhesive 400 is applied in such a manner as to bridge the boundary portions between the mounted surfaces 204a and 204b, and the upper surfaces of the wall portions 301 and 302 from above. With the above arrangement, when the mounted surfaces 204a and 204b are moved in X-axis direction, the adhesive 400 easily causes elastic deformation. In this way, the position of the optical axis (center axis) of the lens holder 200 is maintained at the position before expansion by the movements of the parts. Thus, in the embodiment, optical axis displacement resulting from thermal expansion of the lens holder 200 can be suppressed.

It is desirable to use the adhesive 400 having a large elasticity to maximally suppress movement of the mounted surfaces 204a and 204b at the time of thermal expansion. In view of this, it is preferable to use e.g. an acrylic-based adhesive having a large elasticity as the adhesive 400.

As described above, the embodiment is advantageous in realizing a lens fixing device capable of facilitating an operation of fixedly attaching a lens and properly suppressing optical axis displacement of the lens resulting from a temperature change, and an optical pickup device incorporated with the lens fixing device, with a simplified arrangement.

Further, in this embodiment, the projections 202a and 202b have a predetermined width in X-Y plane direction and Z-axis direction. Accordingly, the rigidity of the projections 202a and 202b is high, and there is no likelihood that the projections 202a and 202b may be damaged even if the lens holder 200 is pressed from above and from the front side as described above in assembling.

Furthermore, in this embodiment, since the mounted surfaces 204a and 204b, and the upper surfaces of the wall portions 301 and 302 are made substantially flush with each other, adhesion by the adhesive 400 can be easily performed.

In this embodiment, the angle α defined by the guide surfaces 203a and 203b, and the angle β defined by the receiving surfaces 304a and 304b are respectively set to 90 degrees. As far as the position of the lens holder 200 within X-Y plane can be fixed by pressing the lens holder 200 from above, any angle is allowed for the above angles α and β. Specifically, the above angles α and β may be set smaller than 180 degrees, and preferably set to an angle smaller than about 120 degrees. If the above angles α and β are smaller than about 120 degrees, it is possible to position the lens holder 200 to an intended position by the gravitational force only by placing the lens holder 200 in the recessed portion 303. If the above angles α and β are unduly small, the dimension of the lens fixing device in Y-axis direction is increased. In view of this, it is desirable to set the above angles α and β to at least about 60 degrees.

MODIFICATION EXAMPLE

Figure 5B:
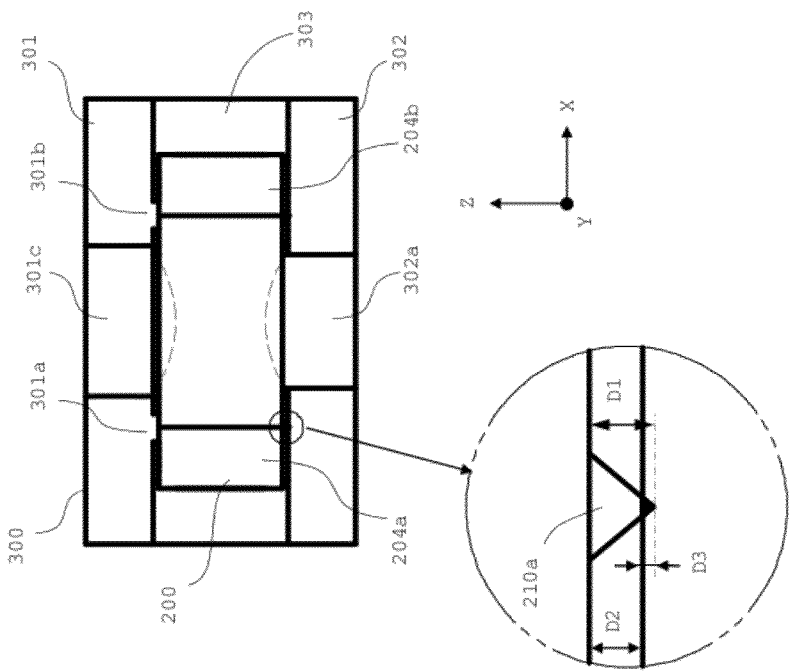
FIGS. 5A and 5B are diagrams showing an arrangement of a lens portion and a mounting portion in a modification example of the embodiment.
Figure 5A:
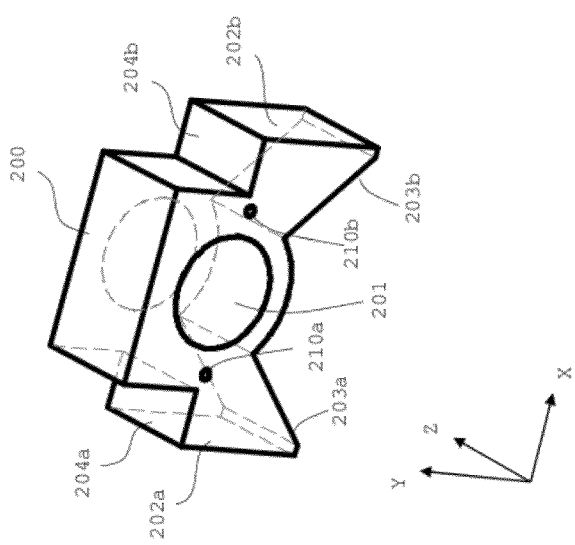

FIGS. 5A and 5B are diagrams showing a modification example of the lens fixing device. In the modification example, as shown in FIG. 5A, two tapered projections 210a and 210b are formed on a front surface of a lens holder 200. The projections 210a and 210b are disposed at such positions as to substantially align with ribs 301a and 301b in Z-axis direction, when the lens holder 200 is mounted on a mounting portion 300. Further, as shown in the partially enlarged view of FIG. 5B, the height D1 of the projections 210a and 210b is set larger than the gap D2 between the front surface of the lens holder 200 and a back surface of a wall portion 302 by the dimension D3 when the back surface of the lens holder 200 is pressed against the ribs 301a and 301b.

In the modification example, it is possible to easily position the lens holder 200 in the optical axis direction by the operation of the projection 210a. Specifically, as shown in FIGS. 3A through 3C, when the lens holder 200 is placed in the recessed portion 303, the projections 210a and 210b are abutted against the back surface of the wall portion 302, and the lens holder 200 is applied with a force in the direction toward the wall portion 301. Thereafter, when the lens holder 200 is pressed inside the recessed portion 303, the back surface of the lens holder 200 is pressed against the ribs 301a and 301b by the pressing force. With the pressing operation, distal ends of the projections 210a and 210b are contracted by the dimension D3 so that the height of the projections 210a and 210b becomes equal to D2.

As described above, in the modification example, by the operation of the projections 210a and 210b, it is possible to position a lens area 201 in the optical axis direction of the lens area 201 only by pressing the lens holder 200 into the recessed portion 303. Thus, the modification example is advantageous in simplifying the operation of fixedly attaching the lens holder 200.

In the modification example, the shape of the projections 210a and 210b is not limited to the one shown in FIGS. 5A and 5B. For instance, the projections 210a and 210b may have a round shape at a distal end thereof or the entirety thereof. Further, in the modification example, since the ribs 301a and 301b for positioning in Z-axis direction are formed on the wall portion 301, the projections 210a and 210b are formed on the front surface of the lens holder 200. In the case where the ribs are formed on the back surface of the wall portion 302, the projections are formed on the back surface of the lens holder 200.

It is required to change the height D1 of the projections 210a and 210b depending on the hardness of the wall portion 302. Specifically, in the case where the wall portion 302 is made of a relatively soft material, the projections 210a and 210b with an excessively large height may form grooves corresponding to the projections 210a and 210b in the back surface of the wall portion 302 when the lens holder 200 is pressed into the recessed portion 303, and the projections 210a and 210b may be engaged in the grooves. Then, at the time of thermal expansion of the lens holder 200, the projections 210a and 210b may be engaged in the grooves, which may obstruct smooth movement of the parts of the lens holder 200. In view of this, it is necessary to properly set the height of the projections 210a and 210b to avoid the above drawback.

Further, in the modification example, the projections 210a and 210b are formed on the lens holder 200 at a boundary portion between the lens holder 200 and the mounting portion 300. Alternatively, the projections may be formed on the mounting portion 300.

The embodiment and the modification example of the invention have been described as above. The invention is not limited to the foregoing embodiment and modification example, and the embodiment of the invention may be modified in various ways other than the above.

For instance, in the embodiment and the modification example, the lens fixing device having the arrangement as shown in FIGS. 2A through 2C, and FIGS. 3A through 3C is used to fixedly attach the anamorphic lenses 109 and 128. Alternatively, the lens fixing device may be used to fixedly attach the other lenses such as the collimator lens 124, and the first and the second objective lenses 108 and 127.

Further, in the embodiment and the modification example, an optical pickup device incorporated with two objective lenses has been described. The optical system in the optical pickup device is not limited to the foregoing embodiment and modification example. Specifically, it is possible to apply the invention to an optical pickup device incorporated with only one objective lens.

Furthermore, in the embodiment and the modification example, the ribs 301a and 301b for positioning the lens holder 200 in Z-axis direction are formed. In the case where the plane precision of the wall portion 301 is high and it is possible to properly position the lens holder 200 in Z-axis direction without forming the ribs, the ribs 301a and 301b may be omitted.

Furthermore, in the embodiment and the modification example, the mounted surfaces 204a and 204b extend perpendicular to the direction in which the lens holder 200 is mounted. Alternatively, the mounted surfaces 204a and 204b may be tilted with respect to Y-axis direction. Further alternatively, the arrangement that the mounted surfaces 204a and 204b, and the wall portions 301 and 302 are not made flush with each other and a slight step difference may be formed between the mounted surfaces 204a and 204b, and the wall portions 301 and 302.

Furthermore, in the embodiment and the modification example, the mounting portion 300 is integrally formed with the base by using PPS. Alternatively, the mounting portion and the base may be made of other material, for instance, aluminium or magnesium.

Further alternatively, the lens fixing device having the arrangement as shown in FIGS. 2A through 2C, and FIGS. 3A through 3C may be used to fixedly attach a lens in an optical device other than an optical pickup device.

The embodiment of the invention may be changed or modified in various ways as necessary, as far as such changes and modifications do not depart from the scope of the claims of the invention hereinafter defined.

What is claimed is:

1. A lens fixing device comprising:
a lens portion including a lens made of a resin; and
a mounting portion on which the lens portion is mounted, wherein:
the lens portion includes two projections projecting in directions away from a center axis of the lens,
each of the two projections has a guide surface opposing to the mounting portion, and a mounted surface disposed away from the mounting portion with respect to the guide surface,
the guide surfaces and the mounted surfaces are disposed at such positions that a line of intersection of an extension of the respective guide surfaces and an extension of the respective mounted surfaces is aligned with the center axis of the lens, and
an angle defined by the guide surfaces of the two projections around the center axis is set smaller than 180 degrees, and
wherein:
the mounting portion includes two receiving surfaces to be brought into surface contact with the guide surfaces of the two respective projections in mounting the lens portion on the mounting portion, and a fixing surface adapted to be positioned adjacent to the mounted surfaces in a state that the two guide surfaces are brought into surface contact with the two respective receiving surfaces, and
the mounted surfaces and the fixing surface are fixed to each other by an adhesive in a direction perpendicular to the mounted surfaces and the fixing surface in a state that the two guide surfaces are brought into surface contact with the two respective receiving surfaces.

2. The lens fixing device according to claim 1, wherein the mounted surfaces are made flush with the fixing surface when the lens portion is mounted on the mounting portion.

3. The lens fixing device according to claim 1, wherein the guide surfaces of the two projections are tilted in opposite directions to each other with the same angle with respect to a direction in which the lens portion is mounted on the mounting portion, and the angle defined by the guide surfaces is set smaller than 120 degrees.

4. The lens fixing device according to claim 1, wherein the adhesive is an acrylic-based UV curable adhesive.

5. The lens fixing device according to claim 1, wherein
a projection for positioning the lens portion while pressing the lens portion in a direction of the center axis of the lens is disposed at a position of a boundary between the lens portion and the mounting portion in the direction of the center axis of the lens.

6. An optical pickup device comprising:
a lens fixing device,
the lens fixing device including
a lens portion having a lens made of a resin, and
a mounting portion on which the lens portion is mounted,
wherein:
the lens portion has two projections projecting in directions away from a center axis of the lens,
each of the two projections has a guide surface opposing to the mounting portion, and a mounted surface disposed away from the mounting portion with respect to the guide surface,
the guide surfaces and the mounted surfaces are disposed at such positions that a line of intersection of an extension of the respective guide surfaces and an extension of the respective mounted surfaces is aligned with the center axis of the lens, and
an angle defined by the guide surfaces of the two projections around the center axis is set smaller than 180 degrees, and
wherein:
the mounting portion includes two receiving surfaces to be brought into surface contact with the guide surfaces of the two respective projections in mounting the lens portion on the mounting portion, and a fixing surface adapted to be positioned adjacent to the mounted surfaces in a state that the two guide surfaces are brought into surface contact with the two respective receiving surfaces, and
the mounted surfaces and the fixing surface are fixed to each other by an adhesive in a direction perpendicular to the mounted surfaces and the fixing surface in a state that the two guide surfaces are brought into surface contact with the two respective receiving surfaces.

7. The optical pickup device according to claim 6, wherein the mounted surfaces are made flush with the fixing surface when the lens portion is mounted on the mounting portion.

8. The optical pickup device according to claim 6, wherein the guide surfaces of the two projections are tilted in opposite directions to each other with the same angle with respect to a direction in which the lens portion is mounted on the mounting portion, and the angle defined by the guide surfaces is set smaller than 120 degrees.

9. The optical pickup device according to claim 6, wherein the adhesive is an acrylic-based UV curable adhesive.

10. The optical pickup device according to claim 6, wherein
a projection for positioning the lens portion while pressing the lens portion in a direction of the center axis of the lens is disposed at a position of a boundary between the lens portion and the mounting portion in the direction of the center axis of the lens.

* * * * *